(12) United States Patent
Zhang et al.

(10) Patent No.: US 10,824,476 B1
(45) Date of Patent: Nov. 3, 2020

(54) MULTI-HOMED COMPUTING INSTANCE PROCESSES

(71) Applicant: Amazon Technologies, Inc., Seattle, WA (US)

(72) Inventors: Shihua Zhang, Issaquah, WA (US); Patrick McFalls, Seattle, WA (US); Amjad Hussain, Bellevue, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 15/628,108

(22) Filed: Jun. 20, 2017

(51) Int. Cl.
*G06F 9/50* (2006.01)
*H04L 29/06* (2006.01)

(52) U.S. Cl.
CPC ........ *G06F 9/5077* (2013.01); *H04L 63/0478* (2013.01); *H04L 63/083* (2013.01); *H04L 63/0884* (2013.01); *H04L 63/08* (2013.01); *H04L 63/0807* (2013.01); *H04L 63/0815* (2013.01); *H04L 63/0823* (2013.01)

(58) Field of Classification Search
CPC combination set(s) only.
See application file for complete search history.

(56) References Cited

U.S. PATENT DOCUMENTS

| | | | |
|---|---|---|---|
| 9,313,187 B1 * | 4/2016 | Huntwork | ............... H04L 63/08 |
| 2015/0222604 A1 * | 8/2015 | Ylonen | ................. H04L 63/062 |
| | | | 713/171 |

* cited by examiner

*Primary Examiner* — Tom Y Chang
(74) *Attorney, Agent, or Firm* — BakerHostetler

(57) ABSTRACT

Techniques for operating a multi-homed computing instance process are described herein. First credentials associated with a first attribute of a first account may be obtained. A process executing on a computing instance may communicate with the first account over a first communication channel based at least in part on the first credentials. Instructions may be received for the process to communicate with both the first account and a second account. Second credentials associated with a second attribute of the second account may be obtained. The second credentials may be obtained based, at least in part, on the first attribute acquiring the second attribute. The process may communicate with the second account over a second communication channel based at least in part on the second credentials. Additionally, the process may communicate with multiple different representations of a particular account, such as different representations that are hosted in different respective regions.

20 Claims, 12 Drawing Sheets

MULTI-HOMED COMPUTING INSTANCE PROCESSES

BACKGROUND

A computing service provider may operate large quantities of computing instances that may be executed on behalf of customers of the service provider. These computing instances may include, for example, virtual machine instances, managed computing hardware and/or software instances, and other computing instances. A particular customer may have multiple different accounts with the service provider, and the customer's associated computing instances may be spread across these different accounts. In some scenarios, a single customer may have computing instances that are spread across hundreds or thousands or respective customer accounts.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
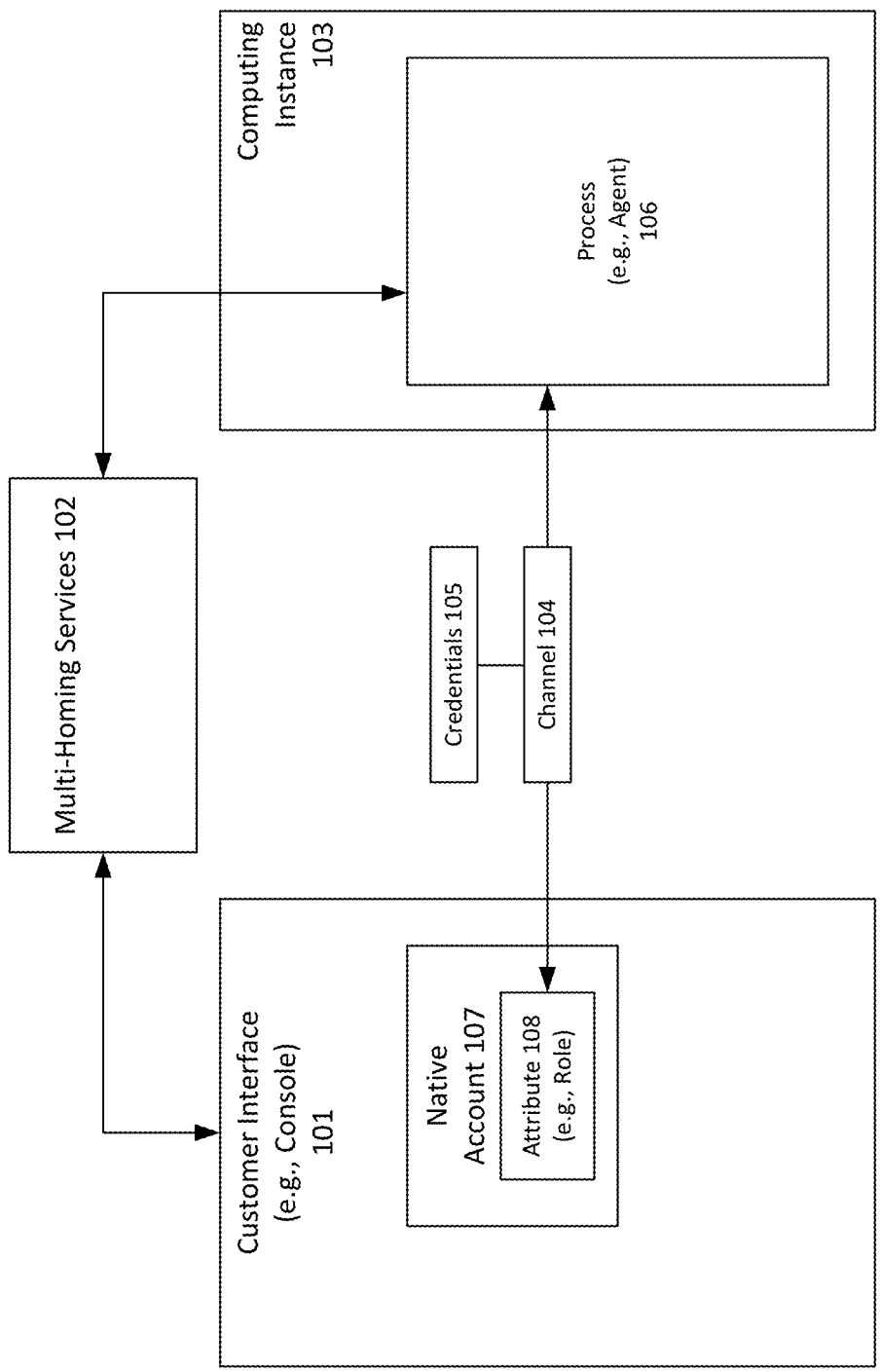
FIG. 1 is a diagram illustrating an example system for establishing multi-homed communications that may be used in accordance with the present disclosure.

Techniques for operating multi-homed computing instance processes are described herein. In one embodiment, a computing service provider may host execution of computing instances on behalf of customers of the service provider. These computing instances may include, for example, virtual machine instances, managed computing hardware and/or software instances, and other computing instances. In one embodiment, a process, such as an agent, may operate on each computing instance to perform various control operations on the computing instance, such as reporting of status information, sending a periodic heartbeat signal, requesting and/or receiving work to perform, configuring, installing, and uninstalling software packages on the computing instances, installing and updating security components, and many other types of operations. In one embodiment, these agents or processes may execute in combination with various specialized components, such as agent plug-in components, which may be specialized for assisting the agent or process with particular types of commands and operations. Also, in one embodiment, the computing service provider may provide one or more interfaces that allow customers to issue various tasks, requests, and commands for execution by the agents or processes on the computing instances.

In one embodiment, a particular customer may have multiple different accounts with the service provider, and the customer's associated computing instances may be spread across these different accounts. As a specific example, a particular customer may have a first account that includes computing instances A, B and C, and a second account that includes computing instances X, Y and Z. Agents and other control processes operating on a particular computing instance are traditionally configured to communicate only with the account to which the computing instance is natively assigned. Continuing with the above example, this may mean that a process executing on computing instance A, B or C may communicate only with the customer's first account (and not the second or other accounts), while a process executing on computing instance X, Y or Z may communicate only with the customer's second account (and not the first or other accounts). These restrictions may result in a number of problematic scenarios. For example, customers often don't think of systems management as per-account or per-region management of infrastructure. Having computing instances spread across different accounts may make it difficult for a customer to perform operations that may be useful to perform globally (e.g., across multiple different accounts), such as installation and updating of security components, receiving and viewing of global inventory, audit or compliance data, configuration and updating of software packages on the computing instances, and many other operations.

Another problematic scenario is that, in addition to being limited to communicating with only a single account, a computing process may also be limited to communicating with only a single representation of that account, such as a representation that is hosted in a particular region, location, or other subsets of computing resources. For example, in some cases, computing instances A, B, and C may be assigned to an account associated with a particular computing service having a first representation that is hosted in New York and a second representation that is hosted in Los Angeles. However, a process executing on computing instance A, B or C may be configured to communicate only with the first account representation that is hosted in New York. If there is an outage, fault, or other problem at the New York data center, then the customer may be unable to communicate with computing instances A, B and C until the problem is corrected.

The techniques described herein may assist in alleviating these and other concerns by providing multi-homed computing instance processes, such as processes that are configurable to communicate with multiple different accounts and/or multiple different representations of the same account. In particular, in one embodiment, upon being launched on a particular computing instance, a process may obtain first security credentials to communicate with a customer's first account, such as account to which the computing instance is natively assigned. Specifically, in one embodiment, the first credentials may allow communication with a first attribute of the first account, such as a particular identity management (IM) role associated with the first account. In one embodiment, the customer may request that the process communicate with a second account. In one embodiment, a second attribute, such as a second role, may be defined within the second account. The second attribute may be defined, for example, via a respective trust policy, to trust the first attribute of the first account. In one embodiment, defining the second attribute in this manner may allow the first attribute of the first account to acquire the second attribute of the second account. The process may then be instructed to communicate with the second account, and the process may be provided with information regarding the second attribute of the second account. The process may then request and obtain, for example via an application programming interface (API), second security credentials for communicating with the second attribute of the second account. Thus, by allowing the first attribute of the first account to acquire the second attribute of the second account, the process may be permitted to communicate with the second account as if were natively assigned to the second account.

In one embodiment, the first account described above may be a native account that is assigned to communicate with only a subset of the customer's computing instances. Additionally, in one embodiment, the second account described above may be a global management account that the customer may use to manage its computing instances that are spread across multiple different native accounts. In one embodiment, the customer may use the global management account to perform operations that may be useful to perform on a global or larger scale. For example, in one embodiment, the global management account may be used to patch computing instances spread across multiple native accounts when a security vulnerability is detected that needs to be fixed immediately. This may alleviate the need for users to separately access multiple different accounts, repeatedly issue the same instructions in the multiple different accounts, monitor and compile results and information from the multiple different accounts, and so forth. As another example, in one embodiment, the global management account may be used to view inventory and compliance for computing instances spread across multiple native accounts.

Moreover, by maintaining the ability for computing instance processes to communicate with the native accounts, the customer may still be able to realize benefits associated with the native accounts. For example, in one embodiment, users of a native account may be assigned different permissions than users of the global management account, and the native account may be employed to perform operations that users of the global management account may not be authorized to perform. For example, in one embodiment, a native account may be operated as a branch information technology (IT) account with users that may perform a wide range of operations on computing instances within that account, while the global management account may be operated as a central IT account in which users are limited to a smaller set of operations.

In one embodiment, techniques such as those described above may also be employed to instruct a process executing on a computing instance to communicate with multiple representations of a single account, such as representations hosted in different regions, locations, and/or or by different subsets of computing devices. For example, in one embodiment, a process may be instructed to communicate with both a first representation of a first account that is hosted in New York and a second representation of the first account that is hosted in Los Angeles. If an outage or other problem occurs in a New York data center that hosts the first representation, the computing instance may still continue to communicate with the second representation hosted in the Los Angeles data center. Thus, by communicating with multiple different representations, tolerance may be achieved to protect against faults and other problems associated with one or more of the representations.

Referring now to FIG. 1, example techniques for establishing a multi-homed computing instance will now be described in detail. In particular, as shown in FIG. 1, a process 106 executes on a computing instance 103. As set forth above, computing instance 103 may include, for example, a virtual machine instance, a managed computing hardware and/or software instance, and other computing instances. As also set forth above, process 106 may be a process, such as an agent, that operates on computing instance 103 to perform various control operations on the computing instance 103, such as reporting of status information, sending a periodic heartbeat signal, requesting and/or receiving work to perform, configuring, installing, and uninstalling software packages on the computing instances, installing and updating security components, and many other types of operations. Process 106 may execute in combination with various specialized components, such as plug-in components, which may be specialized for assisting the process 106 with particular types of commands and operations.

As shown, process 106 communicates with an attribute 108 of a native account 107. In one embodiment, native account 107 may be an account associated with a particular customer, such as a customer of a service provider that hosts execution of computing instance 103 on behalf of the customer. In one embodiment, attribute 108 may be an Identity Management (IM) role associated with the native account 107. In one embodiment, computing instance 103 may have an associated instance profile, which may communicate an indication of attribute 108 to process 106. In FIG. 1, process 106 communicates with attribute 108 via a communication channel 104. In particular, the process 106 obtains security credentials 105 that allow the process 106 to communicate with the attribute 108 over channel 104. In one embodiment, process 106 may acquire credentials 105 from (or otherwise based on) the instance profile for computing instance 103. In one embodiment, credentials 105 may include a security token and/or other types of security credentials. In one embodiment, upon being launched on computing instance 103, process 106 may obtain credentials 105, such as from the instance profile, to communicate with the native account 107.

In one embodiment, the customer may manage the native account 107 via a customer interface 101, such as a console, web interface, client application, and/or other interface. As described in detail below, the customer interface 101 may allow the customer to associate native account 107 with other accounts, such as by defining a relationship between attribute 108 and one or more attributes of the other associated accounts. As also described in detail below, indications of these defined relationships may be provided to multi-homing services 102, which may store these relationships and also instruct process 106 to establish communications and communicate with the other accounts.

Figure 2:
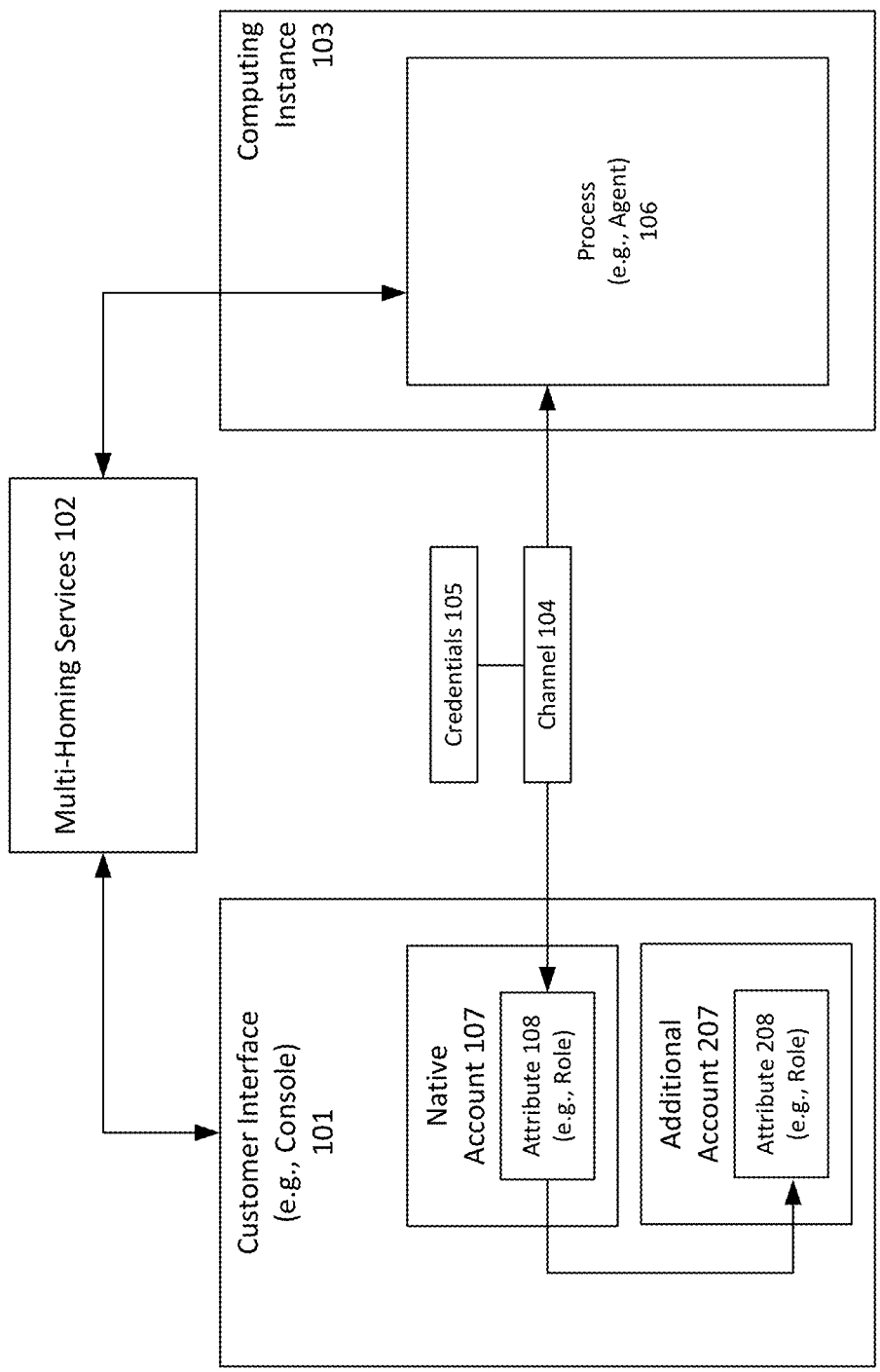
FIG. 2 is diagram illustrating an example account attribute relationship that may be used in accordance with the present disclosure.

Referring now to FIG. 2, an example account attribute relationship will now be described in detail. As shown in FIG. 2, a customer may, for example via customer interface 101, associate native account 107 with an additional account 207. In one embodiment, additional account 207 may be a global account, such as a global management account, that may be used by the customer to manage all the customer's computing instances that may be spread across multiple different native accounts. It is noted, however, that there is no requirement that the additional account 207 must be a global account and/or must manage all (or any particular portion or percentage of) the customer's computing instances. In one embodiment, the customer may generate and/or request the additional account 207, for example via the customer interface 101. In an alternative embodiment, the additional account 207 may be provided (or made available to the customer) without any prior request.

In one embodiment, customer interface 101 may allow the customer to define a relationship between native account 107 and additional account 207. In particular, customer interface 101 may allow the customer to create an attribute 208 of additional account 207, such as an IM role associated with additional account 207. As will be described in detail below, in one embodiment, cross-account communication for process 106 may be achieved by defining a relationship between attribute 108 of native account 107 and attribute 208 of additional account 207. In particular, in one embodiment, cross-account communication for process 106 may be achieved by allowing attribute 108 of native account 107 to acquire, for example to assume the role of, attribute 208 of additional account 207. In one embodiment, in order for attribute 108 to be permitted to acquire attribute 208, attribute 208 may be configured to trust attribute 108. In one embodiment, this trust relationship may be defined in a trust policy of attribute 208 when the attribute 208 is established. Specifically, the trust policy may indicate which accounts/attributes are allowed to delegate access to attribute 208. In one embodiment, customer interface 101 may allow the customer to generate and define attribute 208 and/or the trust policy of attribute 208. The ability of attribute 108 to acquire (e.g., assume the role of) attribute 208 is indicated in FIG. 2 by the arrow pointing from attribute 108 to attribute 208.

Figure 3:
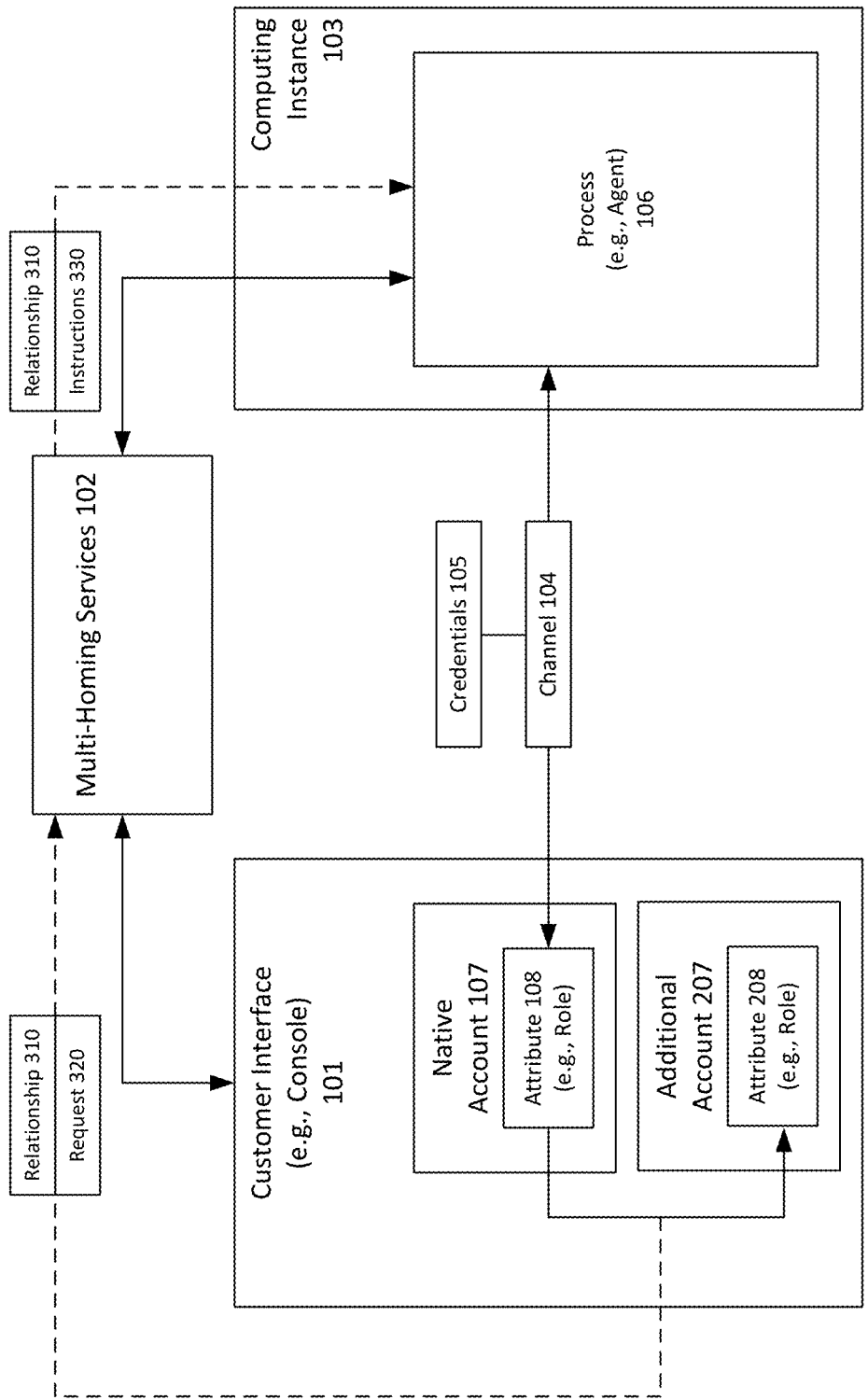
FIG. 3 is diagram illustrating example cross-account communication instructions that may be used in accordance with the present disclosure.

Thus, as shown in FIG. 2, a relationship may be defined between native account 107 and additional account 207 that may allow process 106 to communicate with both such accounts. In one embodiment, upon defining such a relationship, a customer may issue instructions for process 106 to initiate cross-account communications with both native account 107 and additional account 207. Referring now to FIG. 3, some example techniques for issuing of cross-account communication instructions will now be described in detail. In particular, as shown in FIG. 3, the relationship 310 between attributes 108 and 208 (or an indication of the relationship 310) may be provided from customer interface 101 to multi-homing services 102. Multi-homing services 102 may, in turn, store the relationship 310 (or indication thereof) and also provide the relationship 310 (or indication thereof) to the process 106 on the computing instance 103. In addition to relationship 310, the customer interface 101 may also issue a request 320 for process 106 to initiate cross-account communications with both native account 107 and additional account 207. In one embodiment, customer interface 101 may allow the customer to issue a single request for all processes on all computing instances assigned to (or communicating with) native account 107 to initiate cross-account communications with both native account 107 and additional account 207. Allowing the customer to issue a single request for all such processes may save the customer from the need to issue duplicate requests for each computing instance, thereby improving efficiency, particularly for cases in which a large quantity of computing instances are assigned to native account 107.

Upon receiving request 320, the multi-homing services 102 may identify the computing instance 103 and any other computing instances related to the request 320. In one embodiment, if the request 320 relates to all computing instances assigned to native account 107, then multi-homing services 102 may identify all such computing instances. The multi-homing services 102 may then send instructions 330 to the process 106 (and optionally other processes executing on other related computing instances) to initiate cross-account communications with both native account 107 and additional account 207.

Upon receiving instructions 330, the process 106 may then proceed to obtain additional credentials for communicating with additional account 207 over an additional communication channel. In one embodiment, the process 106 may employ its existing credentials 105 for communicating with native account 107 to obtain the additional credentials. In particular, in one embodiment, process 106 may obtain the additional credentials by using attribute 108 or native account 107 to acquire (e.g., assume the role of) attribute 208 of additional account 207. In one embodiment, process 106 may issue a call to an interface, such as an application programming interface (API), for acquiring of attributes of different accounts. In one embodiment, this interface or API may be provided by multi-homing services 102 and/or by a service provider that hosts execution of the customer's computing instances. Process 106 may, for example, issue a call to the interface or API to request the additional credentials for communicating with the additional account 207 based on the relationship 310.

Figure 4:
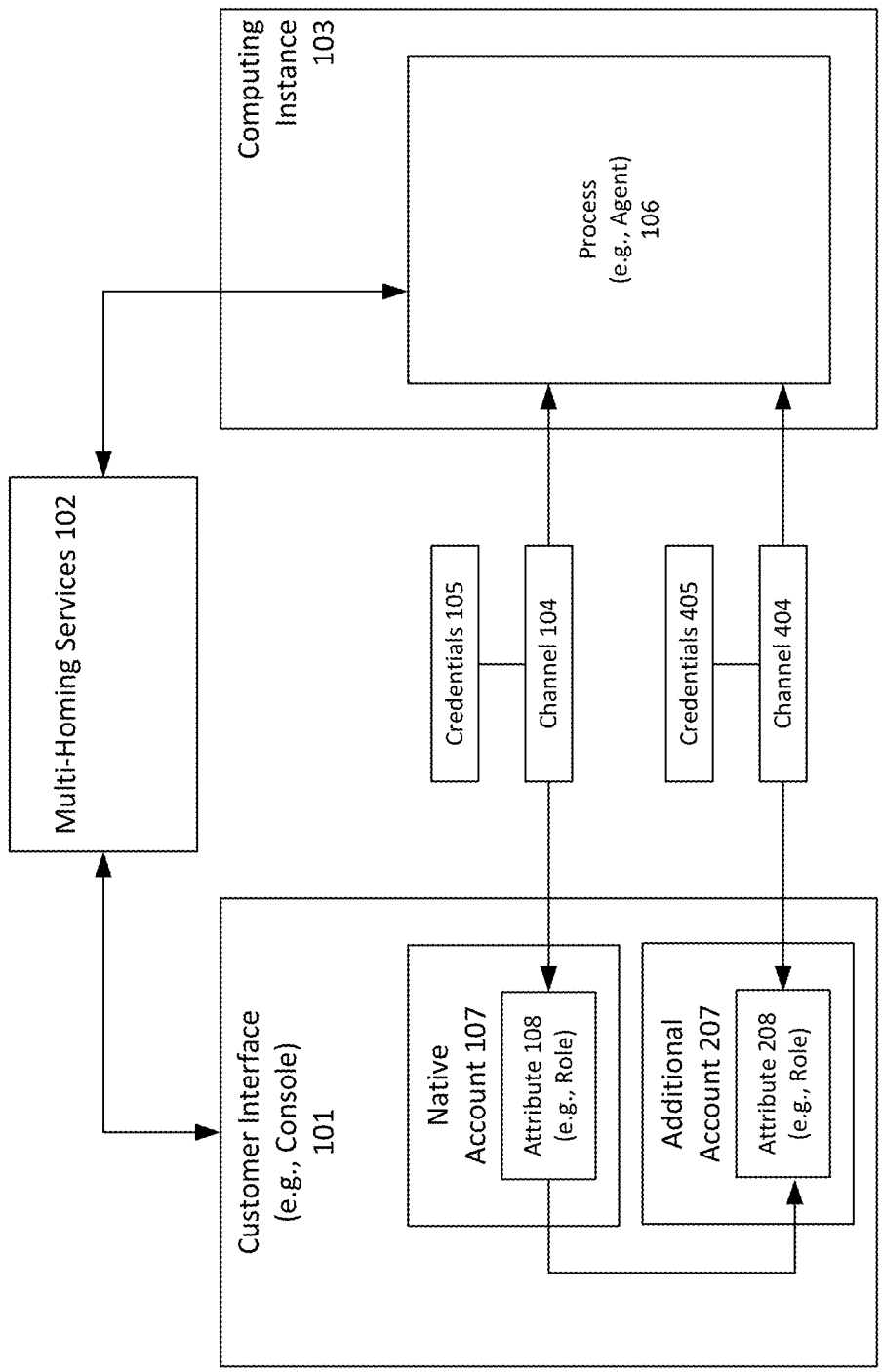
FIG. 4 is a diagram illustrating example cross-account communications that may be used in accordance with the present disclosure.

Referring now to FIG. 4, it is seen that process 106 may obtain additional credentials 405 for communicating with additional account 207 over an additional communication channel 404. In one embodiment, upon using attribute 108 to acquire (e.g., to assume the role of) attribute 208, process 106 may communicate with the additional account 207 as if the process 106 were natively assigned to the additional account 207. In particular, the process 106 may, via credentials 405 and communication channel 404, communicate with the additional account 207 to perform operations such as reporting of status information regarding computing instance 103, sending a periodic heartbeat signal on behalf of computing instance 103, requesting and/or receiving work to perform in relation to computing instance 103, configuring, installing, and uninstalling software packages on the computing instance 103, installing and updating security components on the computing instance 103, and many other types of operations.

In one embodiment, the process 106 may obtain additional credentials and open an additional communication channel for each additional account and/or attribute with which the process 106 is instructed to communicate. Thus, in one embodiment, if the process 106 receives instructions to communicate with a third account and/or attribute, the process may obtain a third set of credentials (in addition to credentials 105 and 405) and open a third communication channel (in addition to channels 104 and 404) to communicate with the third account and/or attribute. Additionally, in one embodiment, each communication channel may pair with its own respective credential provider. This may help to ensure that credentials are retrieved and used properly by process 106.

In one embodiment, the credentials 105 that are used to communicate with the native account 107 may be long-term credentials, while the credentials 405 for additional account 207 (and other credentials for other additional accounts) may be short-term credentials. Additionally, in one embodiment, when the short-term credentials for additional account 207 expire, the process 106 may optionally retrieve new short-term credentials in order to continue to communicate with the additional account 207.

Figure 5:
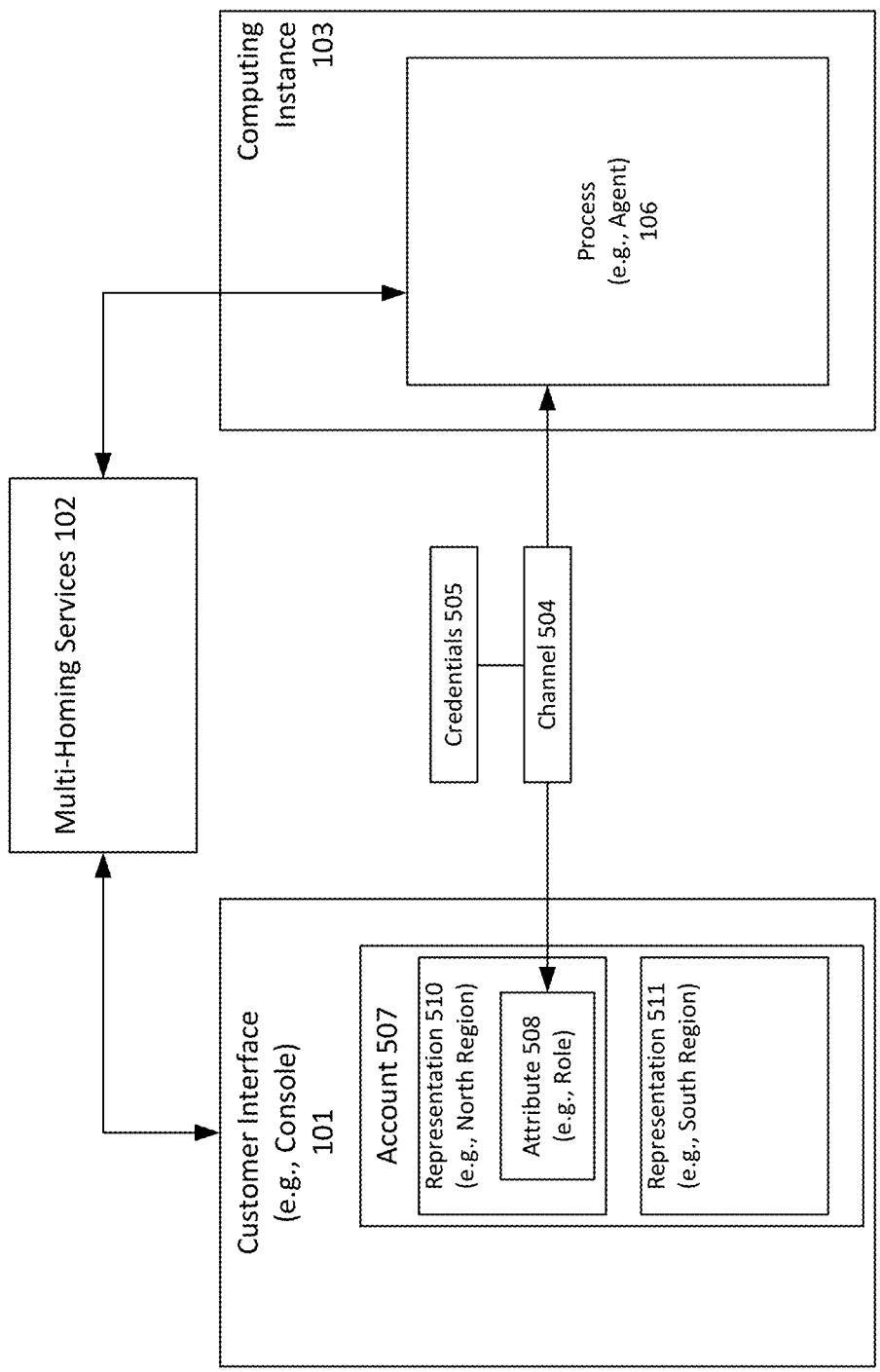
FIG. 5 is a diagram illustrating an example account with multiple representations that may be used in accordance with the present disclosure.

In one embodiment, in addition or as an alternative to instructing a process to communicate with multiple accounts, a process may be instructed to communicate with multiple different representations of the same account. Referring now to FIGS. 5-7B, some example techniques for communication with multiple representations of the same account will now be described in detail. In particular, as shown in FIG. 5, process 106 communicates with attribute 508 of a representation 510 of account 507. In particular, process 106 communicates with representation 510 over communication channel 504 using security credentials 505. As set forth above, a particular account may have multiple different representations. In one embodiment, different representations of the same account may be hosted in different regions, different locations, and/or by different subsets of computing resources. As shown in FIG. 5, account 107 may include both representation 510 and representation 511. However, in the example of FIG. 5, process 106 is configured to communicate only with representation 510 and is not configured to communicate with representation 511. In one embodiment, representation 510 may be hosted by computing resources executing at North region data center, while representation 511 may be hosted by computing resources in a South region data center.

As set forth above, when a process is configured to communicate with only a single representation of a particular account, the process may be vulnerable to faults and other outages associated with that representation that may prevent the customer from communicating with the process. In particular, as shown in FIG. 5, if the North region data center that hosts representation 510 were to experience a fault or outage, the customer may be unable to communicate with process 106 until the fault or outage could be repaired or corrected.

Figure 6A:
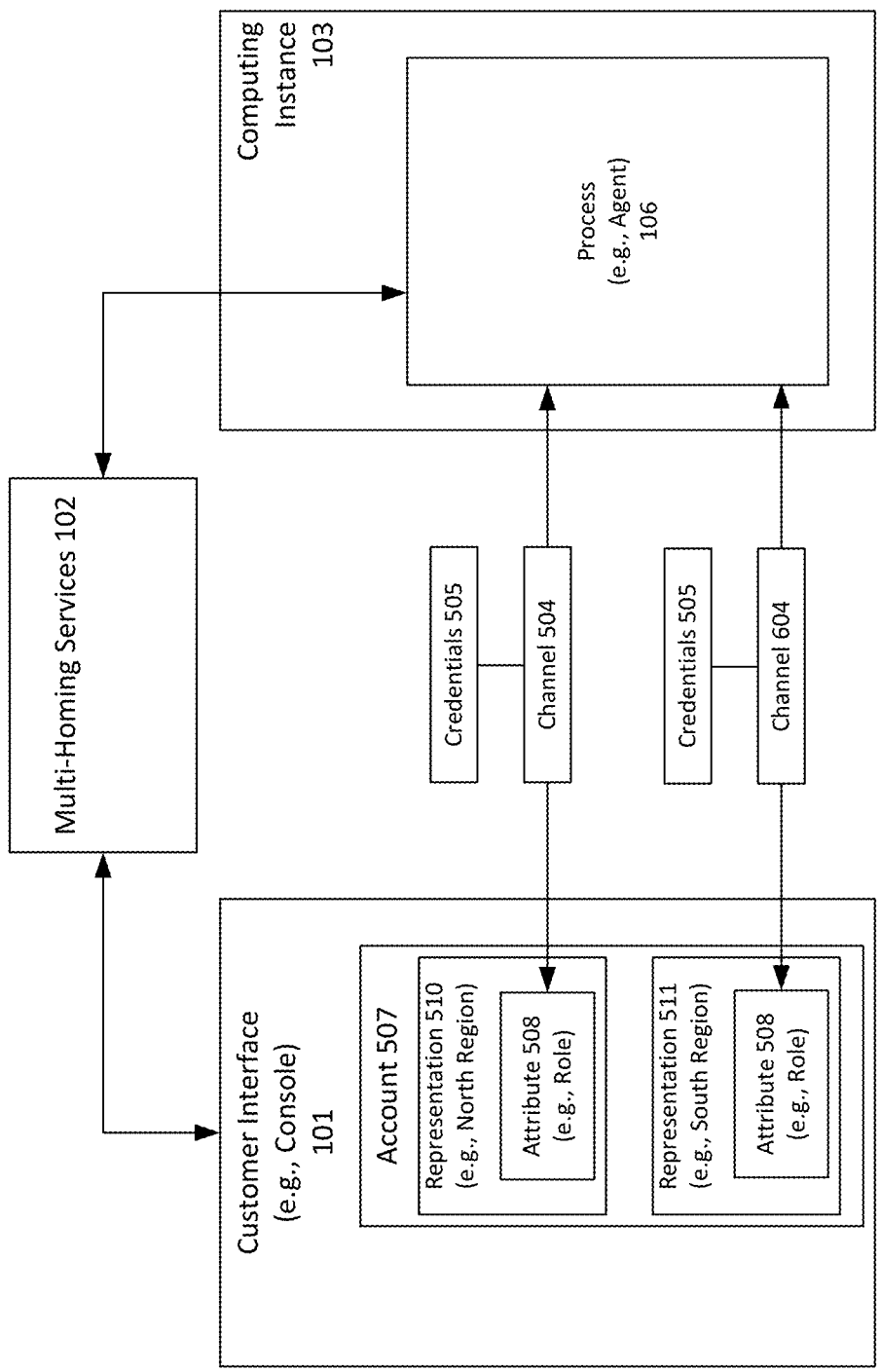
FIG. 6A is a diagram illustrating first example cross-representation communication that may be used in accordance with the present disclosure.

For these and other reasons, in one embodiment, a process may be instructed to communicate with multiple different accounts. Referring now to FIG. 6A, an embodiment will be described in which a customer may assign a single account attribute, attribute 508, to both representation 510 and 511. Assigning attribute 508 to both representation 510 and representation 511 may allow process 106 to communicate with both representation 510 and representation 511 using security credentials 505. In one embodiment, the customer may use customer interface 101 to assign attribute 508 to both representation 510 and 511. Upon making this assignment, customer interface 101 may report an indication of this relationship to multi-homing services 102. Multi-homing services 102 may, in turn, store an indication of this relationship and/or report an indication of this relationship to process 106. Additionally, in one embodiment, customer interface 101 may also issue a request to have process 106 communicate with both representation 510 and representation 511. In one embodiment, this request may be issued for processes executing on all computing instances assigned to account 507, thereby improving efficiency and alleviating the need to issue duplicate requests. In one embodiment, the request may be provided to multi-homing service 102, which may, in turn, issue instructions to process 106 (and any other associated processes) to communicate with both representation 510 and representation 511. Upon receiving the instructions, process 106 to may proceed to establish an additional communication channel 604 and to communicate with representation 511 over communication channel 604 using security credentials 505. Process 106 may also continue to communicate with representation 510 over communication channel 504 using security credentials 505.

Figure 6B:
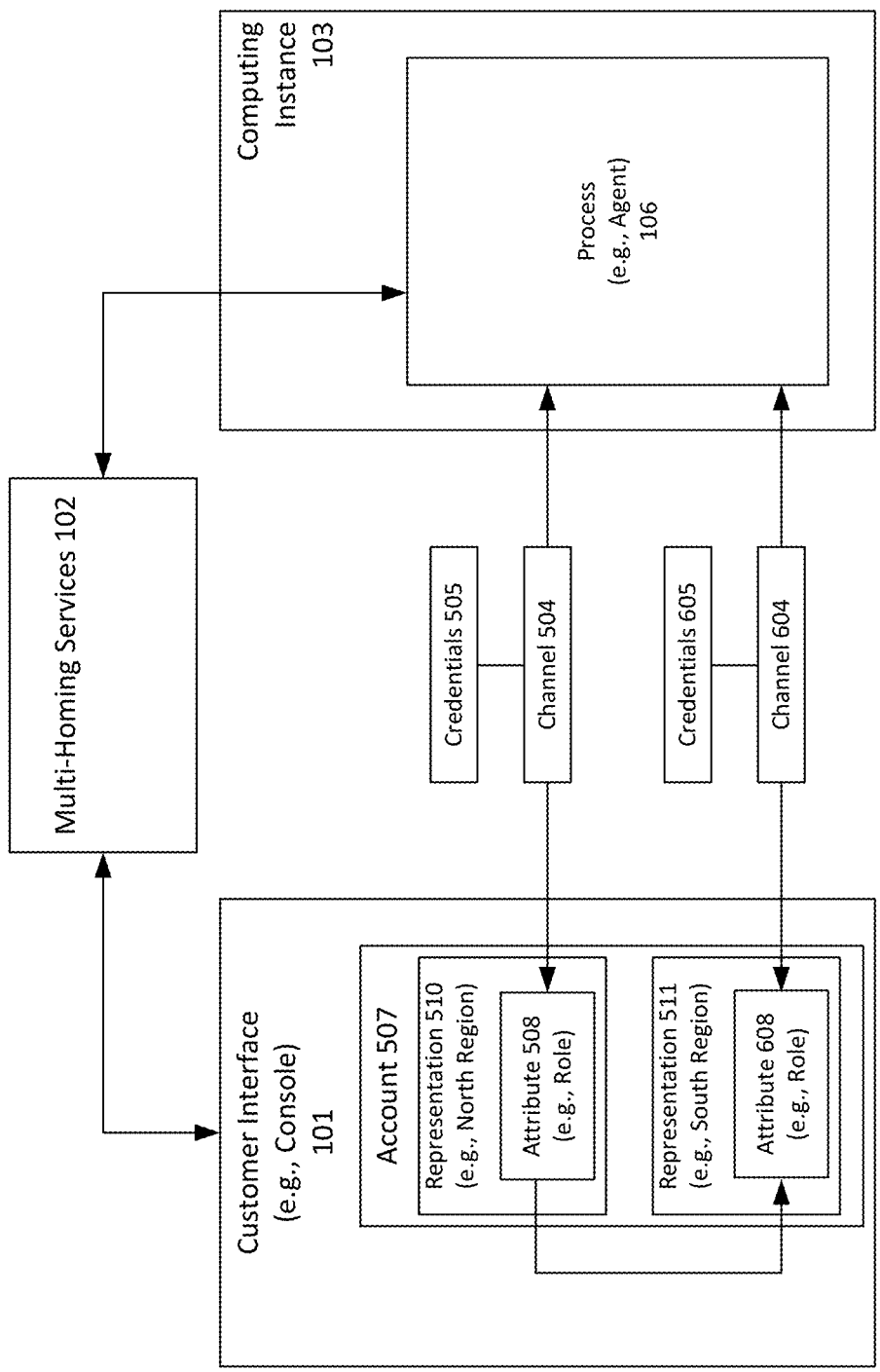
FIG. 6B is a diagram illustrating second example cross-representation communication that may be used in accordance with the present disclosure.

Thus, in one embodiment, a process may communicate with multiple different representations of the same account when a single account attribute is assigned to the multiple representations of the same account. In an alternative embodiment, however, a process may communicate with multiple different representations of the same account when different account attributes are assigned to the multiple representations of the same account. In particular, referring now to FIG. 6B, an embodiment will be described in which a customer may assign different account attributes to representations 510 and 511. Specifically, as shown in FIG. 6B, while attribute 508 is assigned to representation 510, a different attribute 608 may be assigned to representation 511. In the embodiment of FIG. 6B, attribute 508 of representation 510 may be permitted to acquire, for example to assume the role of, attribute 608 of representation 511. In one embodiment, in order to be permitted to be acquired by attribute 608, attribute 608 may be configured to trust attribute 508, and this trust relationship may be defined in a trust policy of attribute 608 when the attribute 608 is established. The ability of attribute 508 to acquire (e.g., assume the role of) attribute 608 is indicated in FIG. 6B by the arrow pointing from attribute 508 to attribute 608.

Thus, as shown in FIG. 6B, a relationship may be defined between attributes 508 and 608 whereby attribute 508 may acquire attribute 608. An indication of this relationship may be provided from customer interface 101 to multi-homing services 102. Multi-homing services 102 may, in turn, store the relationship (or indication thereof) and also provide the relationship (or indication thereof) to the process 106 on the computing instance 103. Additionally, in one embodiment, customer interface 101 may also issue a request to have process 106 communicate with both representation 510 and representation 511. In one embodiment, this request may be issued for processes executing on all computing instances assigned to account 507, thereby improving efficiency and alleviating the need to issue duplicate requests. In one embodiment, the request may be provided to multi-homing service 102, which may, in turn, issue instructions to process 106 (and any other associated processes) to communicate with both representation 510 and representation 511.

Upon receiving the instructions, the process 106 may then proceed to obtain additional credentials for communicating with representation 511 over an additional communication channel. In one embodiment, the process 106 may employ its existing credentials 505 for communicating with representation 510 to obtain the additional credentials. In particular, in one embodiment, process 106 may obtain the additional credentials by using attribute 508 of representation 510 to acquire (e.g., assume the role of) attribute 608 of representation 511. This procedure may be performed similarly to the procedure for requesting additional credentials 405 for communication with additional account 207 described in detail above with reference to FIG. 4. In particular, in one embodiment, process 106 may issue a call to an interface or API to request the additional credentials for communicating with representation 511 based on the relationship between attributes 508 and 608. As shown in FIG. 6B, process 106 may obtain additional credentials 605 for communicating with representation 511 over an additional communication channel 604. In one embodiment, the credentials 505 that are used to communicate with representation 510 may be long-term credentials, while the credentials 605 for representation 511 (and other credentials for other additional representations) may be short-term credentials. Additionally, in one embodiment, when the short-term credentials for representation 511 expire, the process 106 may optionally retrieve new short-term credentials in order to continue to communicate with the representation 511. In one embodiment, the techniques shown in FIGS. 6A and 6B may be employed to allow a process to communicate with any number of representations of the same account.

Figure 7A:
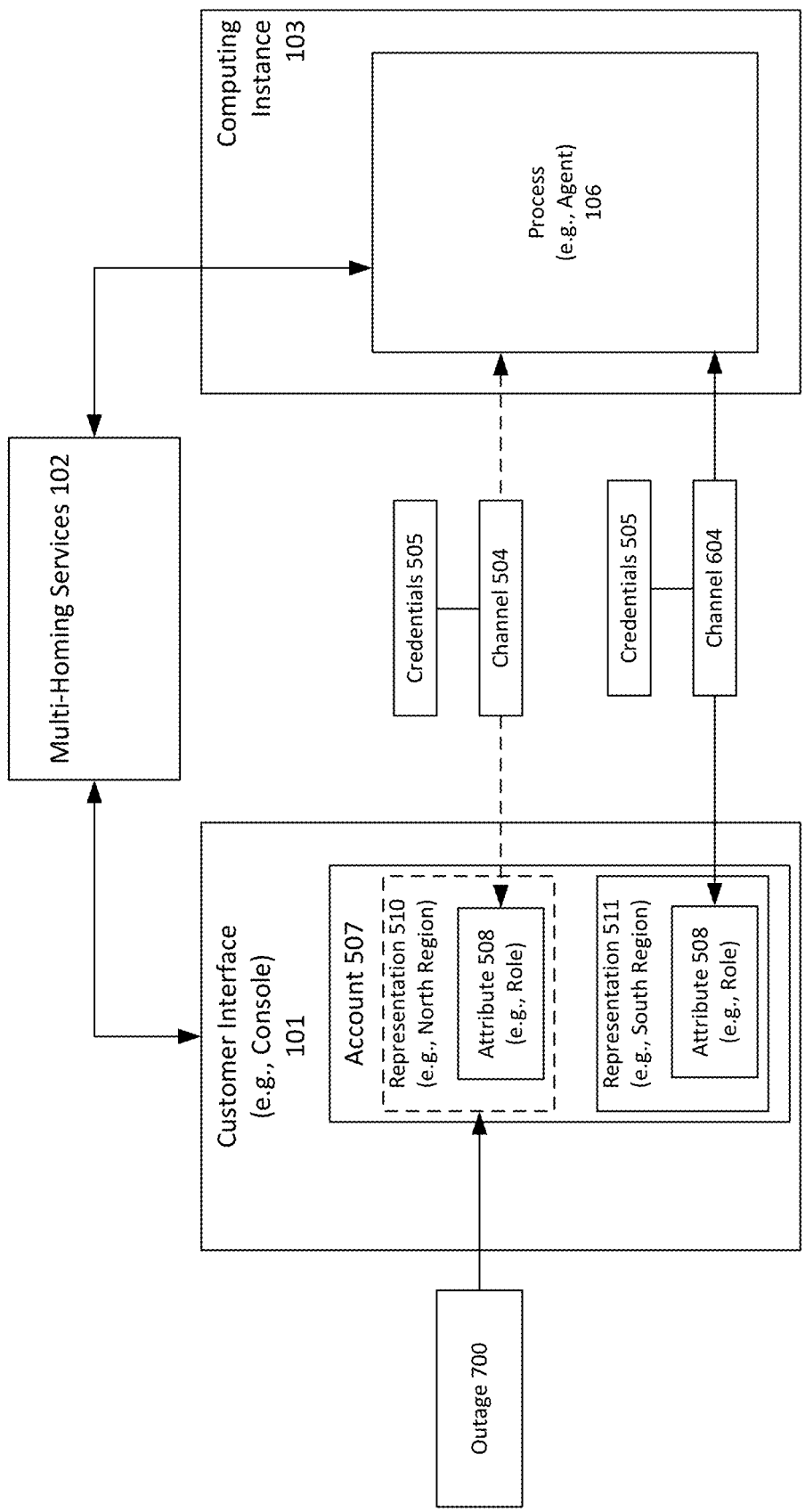
FIG. 7A is a diagram illustrating first example outage tolerance that may be used in accordance with the present disclosure.
Figure 7B:
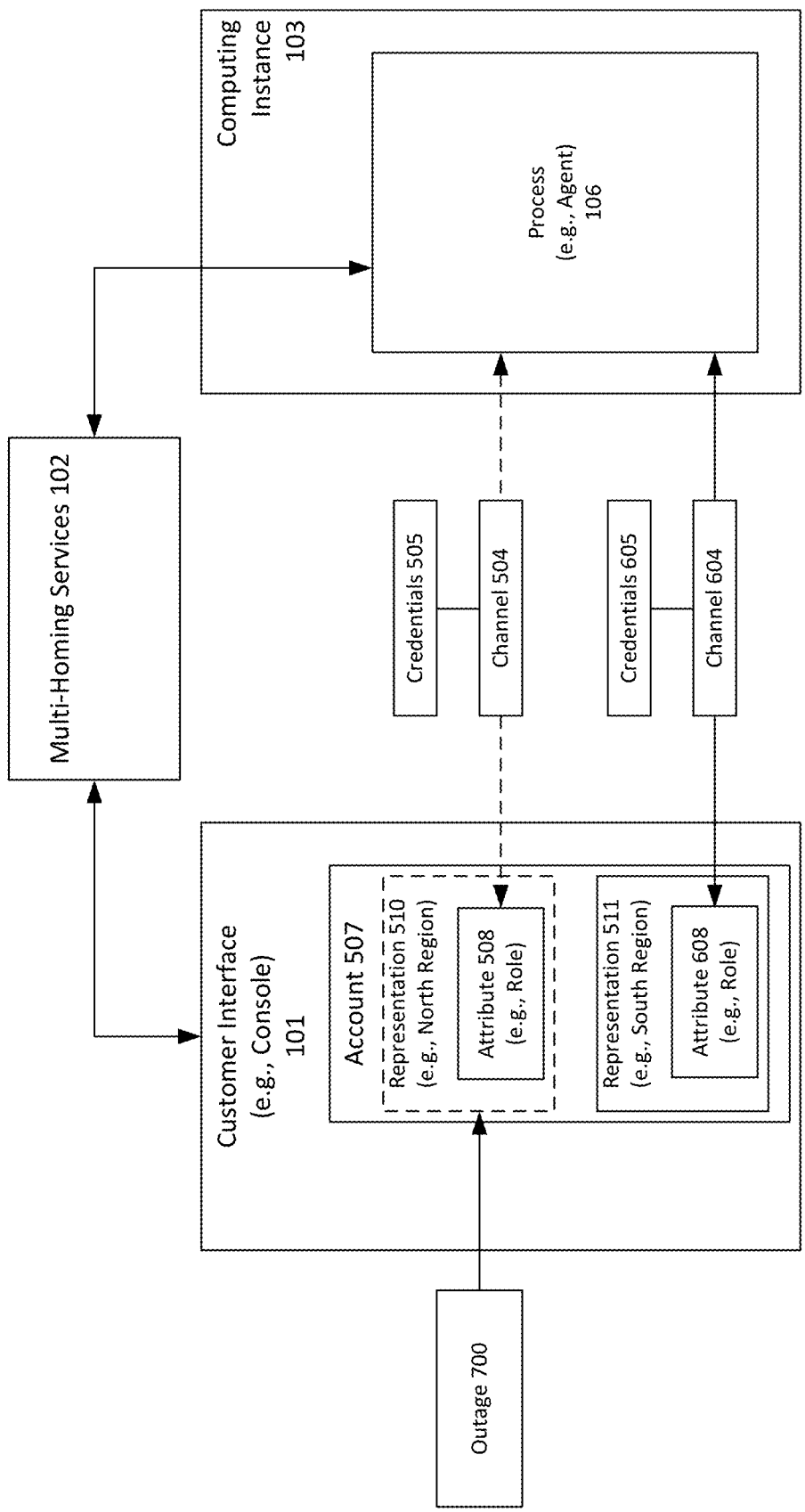
FIG. 7B is a diagram illustrating second example outage tolerance that may be used in accordance with the present disclosure.

Referring now to FIG. 7A, it is seen that allowing a process to communicate with multiple different representations of the same account may provide additional tolerance in the case of faults or outages. In particular, as shown in FIG. 7A, an outage 700 may occur at a North region data center that hosts execution of representation 510. The outage 700 may temporarily prevent process 106 from communicating with representation 510. This is indicated in FIG. 7 by the dashed lines surrounding representation 510 and across communication channel 504. However, in the embodiment of FIG. 7A, the process 106 may still continue to communicate with representation 511, which may be hosted in the South region, thereby allowing the customer to continue to interact with process 106 even while outage 700 is still being repaired. Additionally, as shown in FIG. 7B, an alternative embodiment, in which separate communication channels 504 and 604 are used to communicate with representations 510 and 511, may similarly provide tolerance during outage 700 by allowing process 106 to communicate with representation 511.

Thus, as set forth above, a process executing on a computing instance may communicate with multiple accounts and/or representations, such as for reporting of status information, sending a periodic heartbeat signal, requesting and/or receiving work to perform, configuring, installing, and uninstalling software packages on the computing instances, installing and updating security components, and perform many other types of operations for each account and/or representation. In one embodiment, a service may be operated to provide a customer with information regarding inventory, operations, status data, and many other types of information regarding one or more processes across multiples accounts and/or representations. In one embodiment, a customer may be provided with a report including indications of one or more operations performed by users in each account and/or account representation that communicates with the process. For example, in one embodiment a report may be provided that shows operations performed on a process by users of a first account, operations performed on the process by users of a second account, and operations performed on the process by users of other accounts and/or account representations that may communicate with the process. Also, in one embodiment, a report may be provided that shows computing instance inventory, status information, compliance, or other types of information across multiple accounts and/or account representations.

Figure 8:
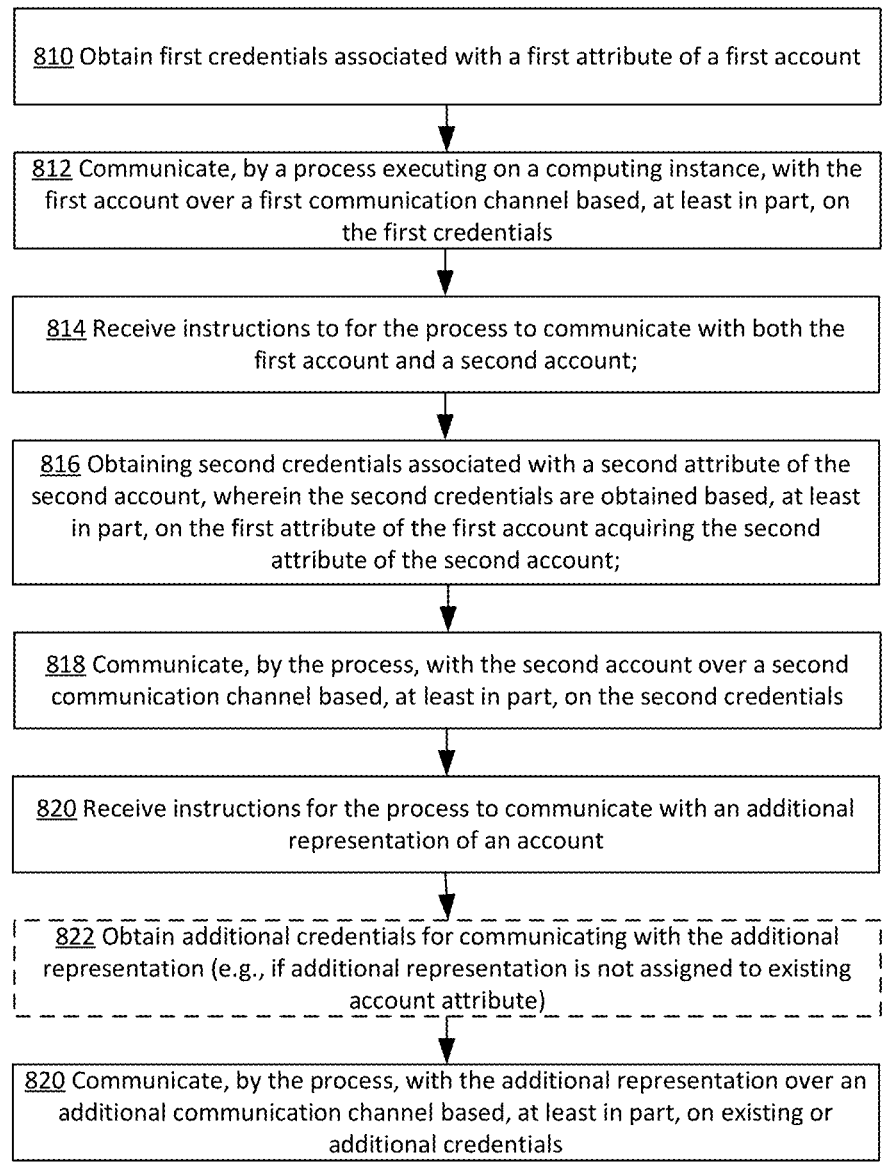
FIG. 8 is flowchart illustrating an example process for multi-homed communications that may be used in accordance with the present disclosure.
Figure 9:
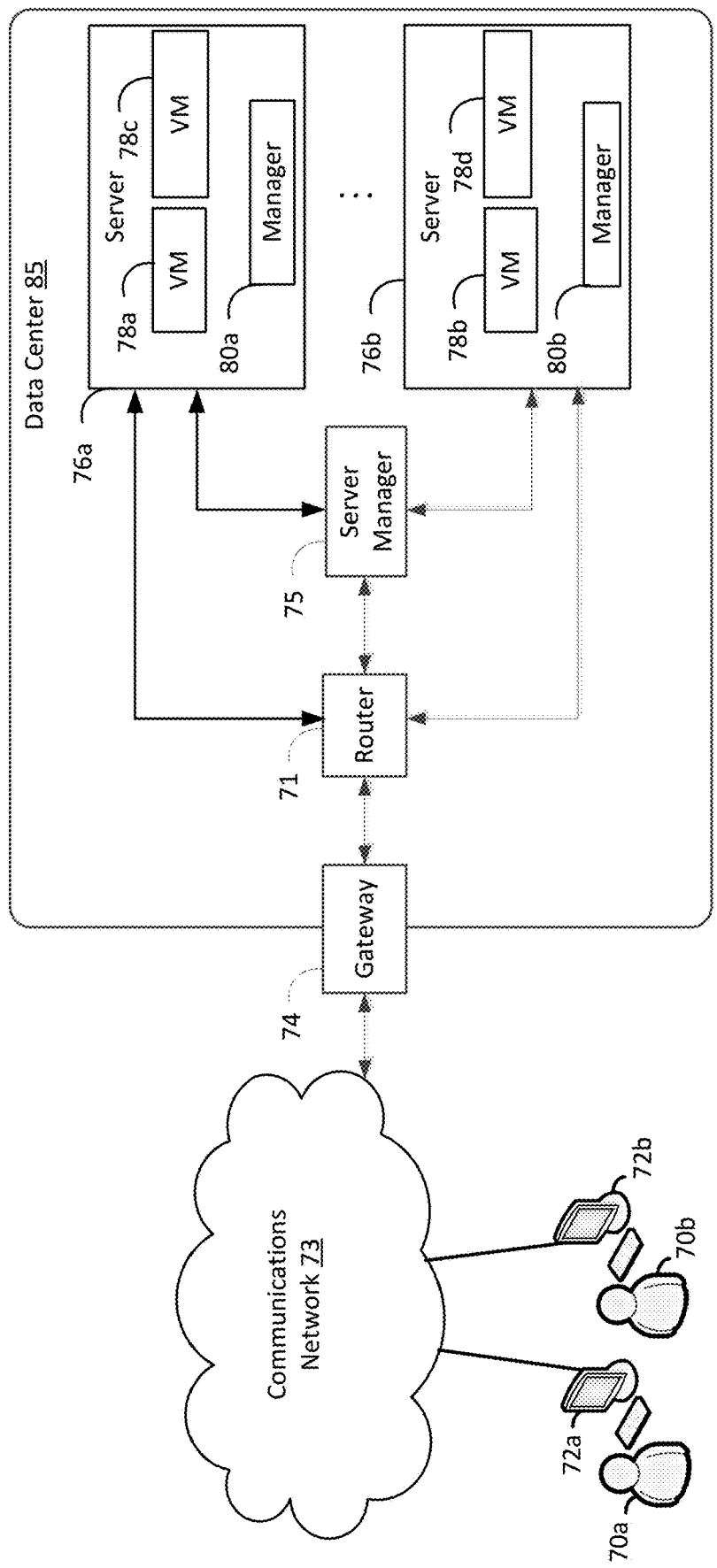
FIG. 9 is a diagram illustrating an example system for transmitting and providing data that may be used in accordance with the present disclosure.

FIG. 8 is flowchart illustrating an example process for multi-homed communications that may be used in accordance with the present disclosure. As shown, the process of FIG. 8 is initiated at operation 810, at which first credentials associated with a first attribute of a first account are obtained. As set forth above, in one embodiment, a process, such as process 106, may execute on a computing instance, such as computing instance 103. In one embodiment, the process may be an agent, and the computing instance may be a virtual machine instance. In one embodiment, the first account may be a native account to which the computing instance is natively assigned. Additionally, in one embodiment, the first attribute of the first account may be an Identity Management (IM) role associated with the first account. Furthermore, in one embodiment, the first credentials may include a security token associated with the first attribute, and the process may obtain the first credentials by requesting the first credentials from a credential provider.

At operation 812, the first account is communicated with, by the process executing on the computing instance, over a first communication channel based at least in part on the first credentials. As shown in FIG. 1, process 106 may communicate with account 107 over communication channel 104 using credentials 105. In one embodiment, the process may communicate with the first account to report status information, send a periodic heartbeat signal, request and/or receive work to perform, configure, install, and uninstall software packages on the computing instance, install and update security components, and to perform many other types of operations.

At operation 814, instructions are received for the process to communicate with both the first account and a second account. In one embodiment, the first account and the second account may both be assigned to a customer of a service that hosts execution of the computing instance on behalf of the customer. Additionally, in one embodiment, the second account may be a global management account, such as may manage a plurality of computing instances that are spread across a plurality of native accounts, which may include the first account. Furthermore, in one embodiment, the customer may issue a request for the process to communicate with both the first account and the second account, and instructions may then be provided to the process to communicate with both the first account and the second account.

In one embodiment, the customer may define a relationship between the first attribute of the first account and a second attribute of the second account, In particular, the customer may configure the second attribute of the second account to trust the first attribute of the first account, such as through a trust policy of the second attribute. In one embodiment, this trust relationship may allow the first attribute to acquire, such as to assume the role of, the second attribute. An indication of this defined relationship may be provided from the customer to the process, such as via one or more intermediate services.

At operation 816, second credentials associated with a second attribute of the second account are obtained. In one embodiment, the second credentials are obtained based, at least in part, on the first attribute of the first account acquiring the second attribute of the second account. In particular, in one embodiment, the process may use the first attribute of the first account to acquire the second attribute of the second account based, at least in part, on the second attribute being defined to trust the first attribute, such as via the trust policy of the second attribute. Additionally, in one embodiment, the first credentials may include a security token associated with the first attribute, and the process may obtain the first credentials by requesting the first credentials from a credential provider, such as using an API or other interface. Furthermore, in one embodiment, the second credentials (and each additional set of credentials obtained by the process) may be obtained from a respective credential provider, which may help to ensure that the credentials are retrieved and used properly. In one embodiment, the process may employ the first credentials to obtain the second credentials. Additionally, in one embodiment, the first credentials may be long-term credentials, while the second credentials may be short-term credentials. Furthermore, in one embodiment, when the short-term credentials expire, the process may optionally retrieve new short-term credentials in order to continue to communicate with the second account.

At operation 818, the second account is communicated with, by the process, over a second communication channel based at least in part on the second credentials. As shown in FIG. 4, process 106 may communicate with additional account 207 over communication channel 404 using credentials 405 (and may also continue to communicate with native account 107 over communication channel 104 using credentials 105). In one embodiment, the process may communicate with the additional or second account to report status information, send a periodic heartbeat signal, request and/or receive work to perform, configure, install, and uninstall software packages on the computing instance, install and update security components, and to perform many other types of operations.

At operation 820, instructions are received for the process to communicate with an additional representation of an account, such as the first or second accounts. In particular, in one embodiment, the process may communicate with a first representation of the first account at operation 812, and the process may receive instructions to communicate with a second representation of the first account at operation 820. Additionally or alternatively, the process may communicate with a first representation of the second account at operation 818, and the process may receive instructions to communicate with a second representation of the second account at operation 820. In one embodiment, different representations of the same account may be hosted in different regions, different locations, and/or by different subsets of computing resources. In one embodiment, the customer may issue a request for the process to communicate with the additional representation, and instructions may then be provided to the process to communicate with the additional representation.

At operation 822, the process may obtain additional credentials for communicating with the additional representation. As set forth above, in one embodiment, such as depicted in FIG. 6B, the additional or second representation of the account may be associated with a different attribute than the existing or first representation. In particular, as shown in FIG. 6B, attribute 508 is assigned to representation 510, while a different attribute (e.g., attribute 608) is assigned to representation 511. As also set forth above, attribute 608 may be defined to trust attribute 508, thereby allowing attribute 508 to acquire attribute 608. The process may then use the existing attribute from the existing account representation to acquire the additional attribute of the additional account representation based, at least in part, on the additional attribute being defined to trust the existing attribute. The additional credentials may include a security token associated with the additional attribute, and the process may obtain the additional credentials by requesting the additional credentials from a credential provider, such as using an API or other interface.

In an alternative embodiment, such as depicted in FIG. 6A, the additional or second representation of the account may be associated with the same attribute as the existing or first representation. In particular, as shown in FIG. 6A, the same attribute (e.g., attribute 508) is assigned to both representation 510 and representation 511. Thus, in this alternative embodiment, operation 822 may not be performed, as indicated by the dashed outline of operation 822 in FIG. 8.

At operation 820, the additional (or second) representation is communicated with, by the process, over an additional or third communication channel. In one embodiment, the process may communicate with both the existing (or first) representation of the account and the additional (or second) representation of the same account to report status information, send a periodic heartbeat signal, request and/or receive work to perform, configure, install, and uninstall software packages on the computing instance, install and update security components, and to perform many other types of operations. The second representation may provide tolerance for communicating with the process when the first representation is unavailable to communicate with the process, such as when there is an outage at one or more data centers or other computing resources that host the first representation. Additionally, the first representation may provide tolerance for communicating with the process when the second representation is unavailable to communicate with the process, such as when there is an outage at one or more data centers or other computing resources that host the second representation.

In the embodiment of FIG. 6B, the process may communicate with the additional representation using the additional credentials that may be obtained at operation 822. As shown in FIG. 6B, process 106 may communicate with the additional representation 511 over communication channel 604 using additional credentials 605 (and may also continue to communicate with representation 510 over communication channel 504 using existing credentials 505).

By contrast, in the alternative embodiment of FIG. 6A, the process may communicate with the additional representation using the existing credentials from the existing representation of the account with which the process already communicates. As shown in FIG. 6A, process 106 may communicate with the additional representation 511 over communication channel 604 using existing credentials 505 (and may also continue to communicate with representation 510 over communication channel 504 using existing credentials 505).

Figure 10:
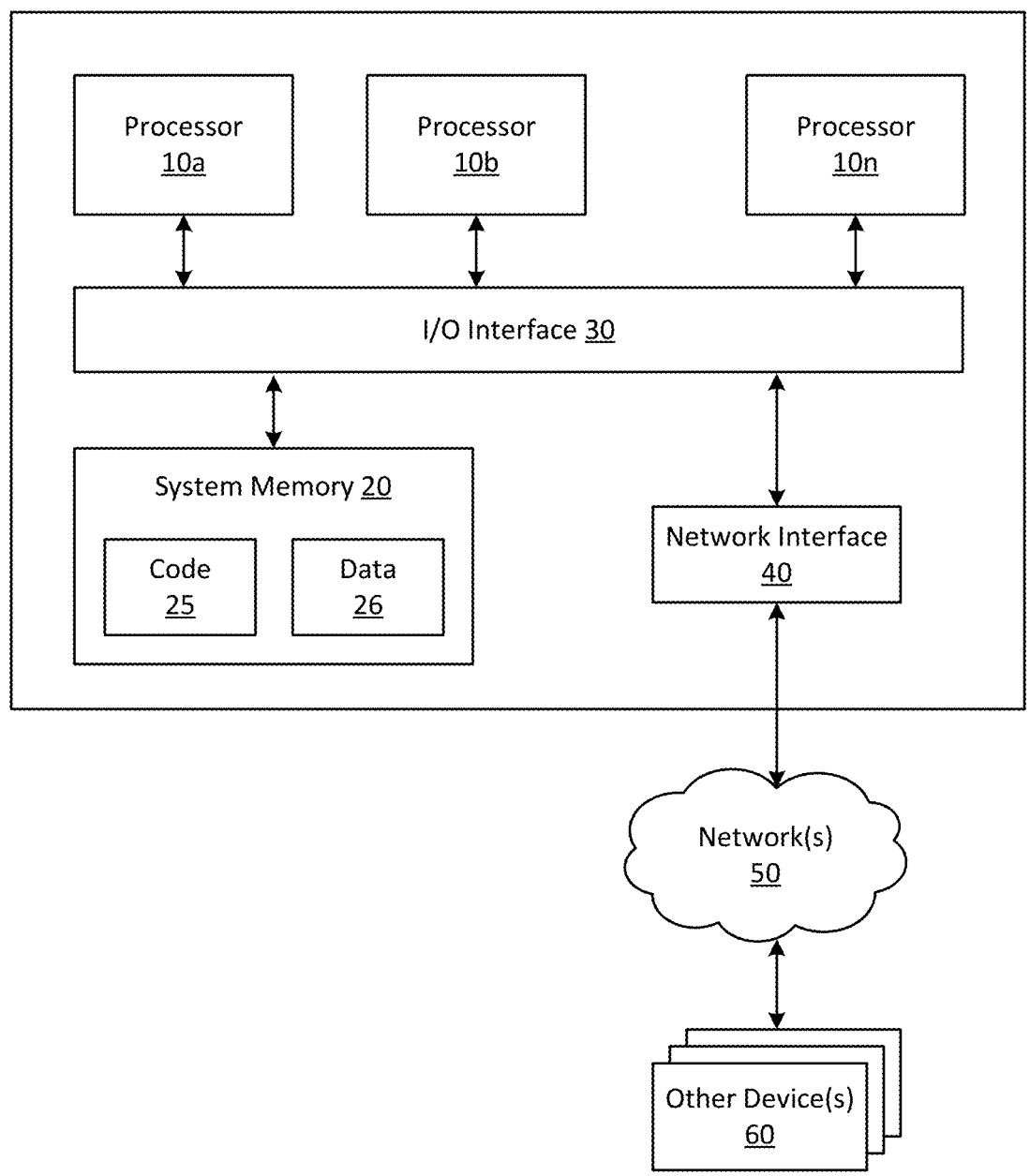
FIG. 10 is a diagram illustrating an example computing system that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76*a* and 76*b*. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more processors
one or more memories storing a set of instructions, which when executed by the one or more processors, causes the one or more processors to perform operations comprising:
obtaining first credentials associated with a first attribute of a first account;
communicating, by a process executing on a virtual machine instance, with the first account over a first communication channel based at least in part on the first credentials;
receiving instructions for the process to communicate with both the first account and a second account;
obtaining second credentials associated with a second attribute of the second account, wherein the second credentials are obtained based, at least in part, on the first attribute of the first account acquiring the second attribute of the second account, wherein the acquiring of the second attribute by the first attribute is performed based on a trust policy of the second attribute, wherein the trust policy indicates a set of one or more trusted attributes that are allowed to delegate access to the second attribute, wherein the first attribute is included in the set of one or more trusted attributes; and
communicating, by the process, with the second account over a second communication channel based at least in part on the second credentials.

2. The system of claim 1, wherein the second account manages a plurality of virtual machine instances that are spread across a plurality of native accounts.

3. The system of claim 1, wherein the process communicates with both a first representation of the second account and a second representation of the second account.

4. The system of claim 3, wherein the first representation is hosted in a first region and the second representation is hosted in a second region.

5. A method comprising:
obtaining first credentials associated with a first attribute of a first account;
communicating, by a process executing on a computing instance, with the first account over a first communication channel based at least in part on the first credentials;
receiving instructions for the process to communicate with both the first account and a second account;
obtaining second credentials associated with a second attribute of the second account, wherein the second credentials are obtained based, at least in part, on the first attribute of the first account acquiring the second attribute of the second account, wherein the acquiring of the second attribute by the first attribute is performed based on a trust policy of the second attribute, wherein the trust policy indicates a set of one or more trusted attributes that are allowed to delegate access to the second attribute, wherein the first attribute is included in the set of one or more trusted attributes; and communicating, by the process, with the second account over a second communication channel based at least in part on the second credentials.

6. The method of claim 5, wherein the first account and the second account are both assigned to a customer of a service that hosts execution of the computing instance on behalf of the customer.

7. The method of claim 5, wherein the second account manages a plurality of computing instances that are spread across a plurality of native accounts.

8. The method of claim 5, wherein the process communicates with both a first representation of the second account and a second representation of the second account.

9. The method of claim 8, wherein the first representation is hosted in a first region and the second representation is hosted in a second region.

10. The method of claim 8, wherein the second representation provides tolerance for communicating with the process when the first representation is unavailable to communicate with the process.

11. The method of claim 5, wherein the process is an agent, and wherein the computing instance is a virtual machine instance.

12. The method of claim 5, wherein communications from the process to at least one of the first account or the second account comprise at least one of reporting status information, sending a periodic heartbeat signal, or requesting work to perform.

13. The method of claim 5, further comprising:
providing a report including indications of one or more first operations performed on the process by users of the first account and one or more second operations performed on the process by users of the second account.

14. A non-transitory computer-readable medium having stored thereon a set of instructions, which when performed by one or more processors, causes the one or more processors to perform operations comprising:
obtaining first credentials associated with a first attribute of a first account;
communicating, by a process executing on a computing instance, with the first account over a first communication channel based at least in part on the first credentials;
receiving instructions for the process to communicate with both the first account and a second account;
obtaining second credentials associated with a second attribute of the second account, wherein the second credentials are obtained based, at least in part, on the first attribute of the first account acquiring the second attribute of the second account, wherein the acquiring of the second attribute by the first attribute is performed based on a trust policy of the second attribute, wherein the trust policy indicates a set of one or more trusted attributes that are allowed to delegate access to the second attribute, wherein the first attribute is included in the set of one or more trusted attributes; and
communicating, by the process, with the second account over a second communication channel based at least in part on the second credentials.

15. The non-transitory computer-readable medium of claim 14, wherein the second account manages a plurality of computing instances that are spread across a plurality of native accounts.

16. The non-transitory computer-readable medium of claim 14, wherein the process communicates with both a first representation of the second account and a second representation of the second account.

17. The non-transitory computer-readable medium of claim 16, wherein the first representation is hosted in a first region and the second representation is hosted in a second region.

18. The non-transitory computer-readable medium of claim 16, wherein the second representation provides tolerance for communicating with the process when the first representation is unavailable to communicate with the process.

19. The non-transitory computer-readable medium of claim 14, wherein the process is an agent, and wherein the computing instance is a virtual machine instance.

20. The non-transitory computer-readable medium of claim 14, wherein communications from the process to at least one of the first account or the second account comprise at least one of reporting status information, sending a periodic heartbeat signal, or requesting work to perform.

* * * * *